United States Patent
Wu et al.

(10) Patent No.: US 11,934,694 B2
(45) Date of Patent: Mar. 19, 2024

(54) MEMORY DEVICE AND METHOD TO RESTOCK ENTRIES IN SERIAL LINK

(71) Applicant: Samsung Electronics Co., Ltd., Gyeonggi-do (KR)

(72) Inventors: Chun-Chu Chen-Jhy Archie Wu, San Carlos, CA (US); Joseph Michael Findley, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 336 days.

(21) Appl. No.: 17/314,449

(22) Filed: May 7, 2021

(65) Prior Publication Data

US 2022/0164142 A1  May 26, 2022

Related U.S. Application Data

(60) Provisional application No. 63/118,488, filed on Nov. 25, 2020.

(51) Int. Cl.
*G06F 3/06* (2006.01)
*G06F 13/14* (2006.01)

(52) U.S. Cl.
CPC .......... *G06F 3/0659* (2013.01); *G06F 3/0604* (2013.01); *G06F 3/0631* (2013.01); *G06F 3/0635* (2013.01); *G06F 3/0673* (2013.01); *G06F 13/14* (2013.01)

(58) Field of Classification Search
None
See application file for complete search history.

(56) References Cited

U.S. PATENT DOCUMENTS

| | | |
|---|---|---|
| 7,308,523 B1 | 12/2007 | Ngai |
| 8,949,500 B2 | 2/2015 | Byrne et al. |
| 10,740,243 B1 | 8/2020 | Benisty |

*Primary Examiner* — Farley Abad
*Assistant Examiner* — Dayton Lewis-Taylor
(74) *Attorney, Agent, or Firm* — The Farrell Law Firm, P.C.

(57) ABSTRACT

A method of a memory device, a storage system, and a memory device are provided. The method includes receiving a set of entries, where the set of entries includes a first entry from a source queue and addressed to a first destination and a second entry addressed to a second destination, determining to add a third entry associated with the first entry and addressed to the first destination to the set of entries, selecting one of the first entry and the third entry as a restock entry and the other of the first entry and the third entry as a pass-through entry, sending the restock entry to the source queue, and sending the second entry and the pass-through entry to a serial link connected to the first destination and the second destination.

20 Claims, 7 Drawing Sheets

MEMORY DEVICE AND METHOD TO RESTOCK ENTRIES IN SERIAL LINK

PRIORITY

This application is based on and claims priority under 35 U.S.C. § 119(e) to U.S. Provisional Patent Application Ser. No. 63/118,488, filed on Nov. 25, 2020, the entire contents of which are incorporated herein by reference.

TECHNICAL AREA

The present disclosure is generally related to memory devices that reduce head of line (HOL) blocking.

BACKGROUND

In a memory device, a sequence of entries in a serial link may be processed. While processing the sequence of entries, the memory device may insert additional commands or data into the sequences, which may cause 1-OL blocking.

SUMMARY

According to one embodiment, a method of a memory device includes receiving a set of entries, where the set of entries includes a first entry from a source queue and addressed to a first destination and a second entry addressed to a second destination, determining to add a third entry associated with the first entry and addressed to the first destination to the set of entries, selecting one of the first entry and the third entry as a restock entry and the other of the first entry and the third entry as a pass-through entry, sending the restock entry to the source queue, and sending the second entry and the pass-through entry to a serial link connected to the first destination and the second destination.

According to one embodiment, a storage system includes a scheduler that receives a set of entries, where the set of entries includes a first entry from a source queue and addressed to a first destination and a second entry addressed to a second destination, a processor that determines to add a third entry associated with the first entry and addressed to the first destination to the set of entries and selects one of the first entry and the third entry as a restock entry and the other of the first entry and the third entry as a pass-through entry, and a path controller that sends the restock entry to the source queue and sends the second entry and the pass-through entry to a serial link connected to the first destination and the second destination.

According to one embodiment, a memory device includes a scheduler, a path controller and a processor connected to the scheduler and the path controller. The scheduler receives a set of entries, where the set of entries includes a first entry from a source queue and addressed to a first destination and a second entry addressed to a second destination. The processor determines to add a third entry associated with the first entry and addressed to the first destination to the set of entries, and selects one of the first entry and the third entry as a restock entry and the other of the first entry and the third entry as a pass-through entry. The path controller sends the restock entry to the source queue, and sends the second entry and the pass-through entry to a serial link connected to the first destination and the second destination.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
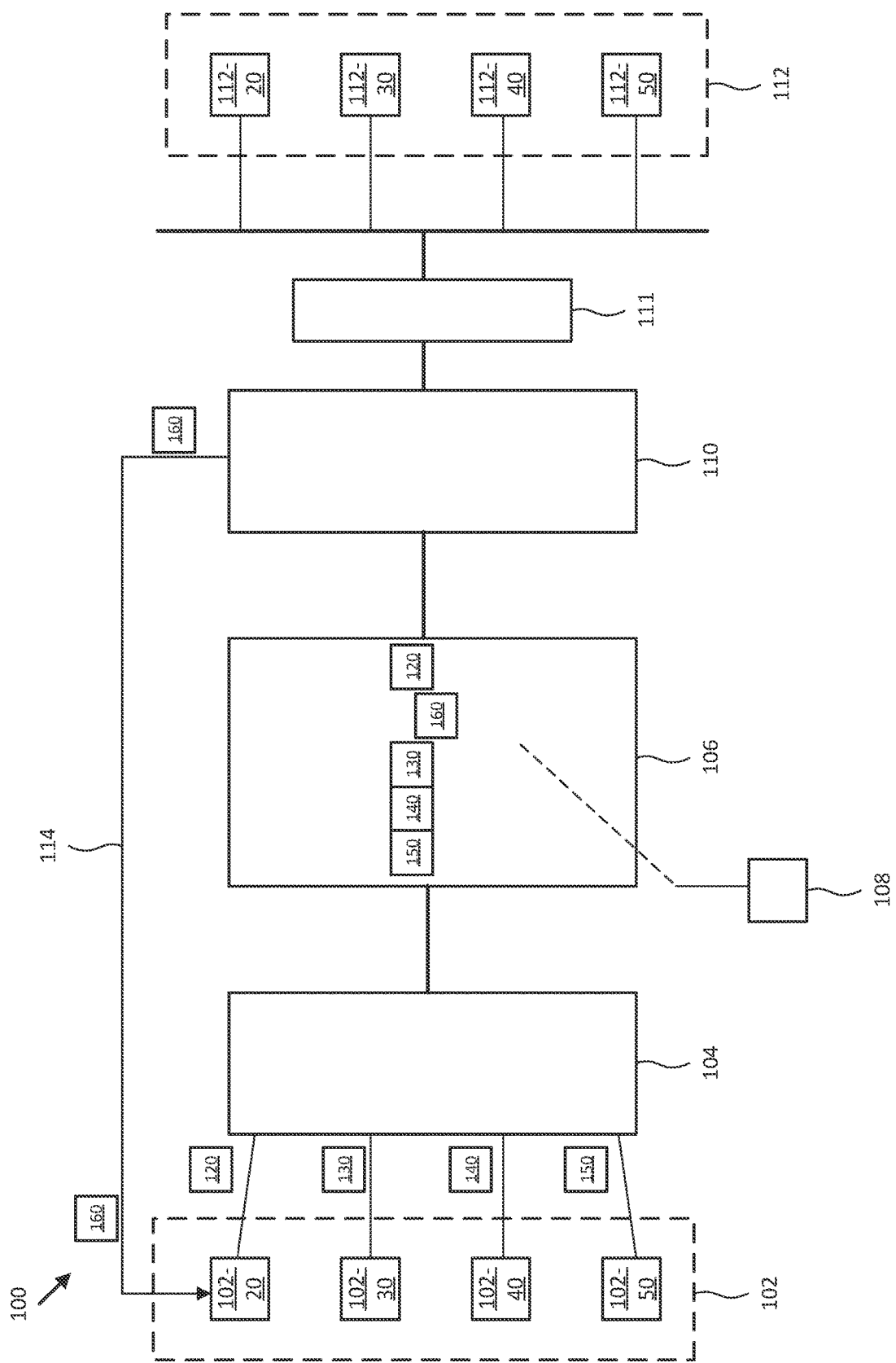
FIG. 1 illustrates a block diagram of a memory device, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block." "part," and "circuitry," A module may be a single integral component, or a minimum unit or part thereof, adapted to perform one or more functions. For example, according to one embodiment, a module may be implemented in a form of an application-specific integrated circuit (ASIC).

A serial link may connect one or more sources to multiple destinations. If the serial link receives two entries bound for the same destination, the later entry may remain on the serial link while the earlier entry is received by the destination. The later entry remaining on the serial link may prevent other entries from being transmitted on the serial link to other destinations. As described herein, an entry may include a command, data, or a combination of such.

When a system wants to add an entry to a set of sequenced entries, and the added entry has the same destination as another entry in the set of sequenced entries, head of line (HOL) blocking may occur, such that the processing of the next entry in the set of sequenced entries is blocked because the added entry (or, if the entry is added to be processed before the entry with the same destination as the added entry, the entry with the same destination as the added entry) cannot be processed until its destination is open, which blocks remaining entries in the sequence from being sent to their respective destinations. The inserted entry or the entry in the set of sequenced entries that has the same destination as the inserted entry may be identified by a path controller (or processor) and sent back to the source queue.

The memory devices may sequence a number of entries to be processed and output to their corresponding destinations. However, during this process, the memory device may want to add an entry associated with a current entry to the same destination in a way that interrupts the sequence. Thus, the memory device may mark the entry with a flag that indicates the entry should be removed from the sequence when exiting from the memory before entering into the serial link and restocked with the entries for future scheduling since two or more entries are not allowed to the same destination. In this way, new entries can be added by the memory device without blocking the HOL.

FIG. 1 illustrates a block diagram of a memory device 100, according to an embodiment. The memory device 100 includes sources 102, a scheduler 104, a serial first-in first-out (FIFO) buffer 106, a processor 108 connected to the buffer 106, a path controller 110, a serial link 111, and destinations 112. The number of sources and destinations depicted is exemplary and not exclusive. The memory device 100 also includes a restock path 114 (e.g., an integrated structure or a separate physical structure) from the path controller 110 to the sources 102. The sources 102 includes source queues 102-20, 102-30, 102-40 and 102-50. The sources 102 may include other types of sources instead of or in addition to the source queues 102-20, 102-30, 102-40 and 102-50. The destinations 112 include destination queue 112-20, 112-30, 112-40 and 112-50. 102-20 and 112-20 are not paired, 102-30 and 112-30 are not paired, 102-40 and 112-40 are not paired, 102-50 and 112-50 are not paired.

The scheduler 104 may include two modes of operation, in addition to a distinct function. The first mode is used as a salve that is similar to an arbiter. The scheduler 104 takes all requests and using either a Round-Robin or fixed-priority method to determine which input to service. The second mode is the master mode, where the scheduler 104 determines the service behavior by itself. The scheduler 104 fetches entries from an input queue (e.g., sources 102). One type of such a model is a "credit base" scheduler, where the scheduler 104 takes x, y, z number of entries from a specific queue. A distinct feature of scheduler 104 is that the scheduler 104 not only monitors the input requests, but also monitors the destination idle condition. Only when a destination is IDLE will the scheduler 104 receive an input. This function helps prevent HOL blocking in the serial link.

The processor 108 is the central processing unit (CPU) that operates the program. The processor 108 monitors the various points of temperature from the sources 102 to the destinations 112. The processor 108 also takes the error rate of transmission in to account. When the temperature rises, and the error rate increases, the processor 108 may perform complex calculations and the insert a threshold voltage adjustment entry to the system. Another example is a module that tracks the statistic of the traffic of a destination to determine if it needs to add a history log after a number of entries. The module may be hardware or CPU software. The path controller 110 may include a de-multiplexer that splits one input into two different outputs. The control direction may be the "restock" attribute of an entry.

In operation, the sources 102 generate a first entry 120 from queue 102-20, a second entry 130 from queue 102-30, a third entry 140 from queue 102-40 and a fourth entry 150 from queue 102-50. The entries may be sent to the scheduler 104 or the scheduler 104 may retrieve the entries from the sources 102 to be properly sequenced. The sequenced entries are then sent to the buffer 106. While processing the sequenced entries, the processor 108 generates a new entry 160, and then adds the entry 160 to the sequenced entries that is to be sent to the same destination as one of the commands entered in the buffer 106, such as the first entry 120. The entry 160 may be marked with the property flag "restock" by the processor 108 or the buffer 106. Then, the sequenced entries, along with the entry 160 are sent to the path controller 110. The path controller 110 identifies the entry 160 to be restocked based on the property flag, removes the entry 160 from the sequenced entries, and sends the entry 160 to the sources 102 via the restock path 114 to the same source queue 102-20 of entry 120 as a IOL entry. The path controller 114 may remove the property flag from the entry 160 so that the entry 160 is not restocked in the next sequence of entries. The path controller 110 (or the processor 108) may add an indicator to the entry 160 to indicate to which queue the entry 160 is to be sent. In this example, the entry 160 may be positioned to be VIOL in the same source queue of the associated entry 120 (i.e., source queue 102-20). The sequenced entries are then output to their respective destinations 112. The entry 160 may be processed by the scheduler 104 when its corresponding destination is idle (i.e., when the destination is not in use or not receiving any command or data). In another example, the processor 108 may insert the entry 160 in front of the sequenced entries and then mark the first entry 120 (or any other entry) of the sequence with the property flag "restock." In this example, the path controller 110 sends the first entry 120 to the source queue 102-20 via the restock path 114. The processor 108 or the path controller 110 may add an indicator to the first entry 120 indicating to which queue the first entry 120 is to be sent. By sending the entry 160 or first entry 120 back to the sources 102 via the restock path 114, a space is introduced between entries bound for the same destination so that one entry does not block the serial link while waiting for the other to be received by the destination. The entry that is processed after an entry is inserted into the serial link may be referred to as a pass-through entry.

In some embodiments, atomicity priority may be utilized, for example, when the insertion of an entry is intended for back-to-back execution. Atomicity priority may guarantee that the scheduler will select the inserted restocked entry before entries from other queues regardless of the priorities of the pending entries from multiple sources. When entry 160 reaches destination 112-20, it follows entry 120, and no other entry from the other source queues will be in-between (e.g., no other entry will reach destination 112-20 until entry 160 is processed).

Figure 2:
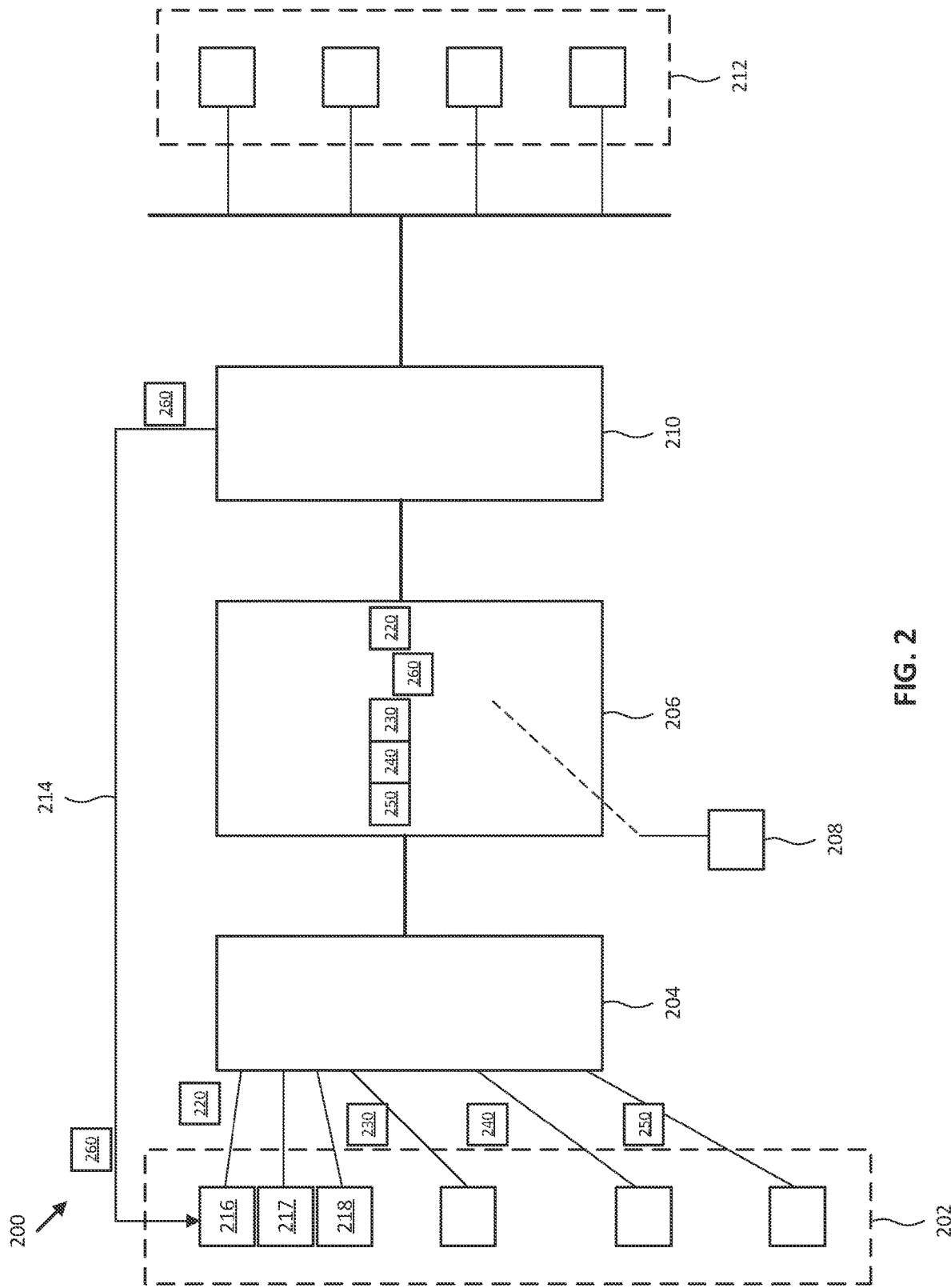
FIG. 2 illustrates a block diagram of a memory device, according to an embodiment.

FIG. 2 illustrates a block diagram of a memory device 200, according to an embodiment. The memory device 200 includes sources 202, a scheduler 204, a serial FIFO buffer 206, a processor 208 connected to the buffer 206, a path controller 210 and destinations 212. The number of sources and destinations depicted is exemplary and not exclusive. The memory device 200 also includes a restock path 214 (e.g., an integrated structure or a separate physical structure) from the path controller 210 to the sources 202. The scheduler 204, processor 208 and path controller 210 may be similar to the scheduler 104, processor 108 and path controller 110 of FIG. 1.

In operation, the sources 202 generate a first entry 220, and second entry 230, and third entry 240 and a fourth entry 250. In this example, multiple source queues (e.g., source queues 216, 217 and 218) each have the same destination. The entries may be sent to the scheduler 204 or the scheduler 204 may retrieve the entries from the sources 202 to be properly sequenced. The sequenced entries are then sent to the buffer 206. While processing the sequenced entries, the processor 208 generates a new entry 260, such that the entry 260 is inserted between the sequenced entries. The entry 260 may be marked with the property flag "restock". Alternatively, an entry (e.g., entry 220) that has a destination that is the same as that of the entry 260 may be marked with the property flag "restock." Furthermore, since the entry 260 is also meant to have priority between multiple entries having the same destination, a property bit may be set in the command to indicate its atomicity to be received/processed back-to-back with entry 220. Then, the sequenced entries, along with the entry 260 are sent to the path controller 210. The path controller 210 identifies the entry 260 to be restocked (or the entry in the sequence that share the same destination as the entry 260) based on the property flag, removes the entry 260 from the sequenced entries, and sends the command to the sources 202 via the restock path 214, along with the atomicity property. The path controller 214 may remove the property flag from the entry 260 so that the entry 260 is not restocked in the next sequence of entries. The entry 260 may be positioned to be HOL of the same source of entry 220 (e.g., processed atomically). The sequenced entries are then output to their respective destinations 212. The entry 260 may be processed by the scheduler 204 when its corresponding destination is idle (i.e., after entry 220 has been received and processed by its destination). The scheduler 204 may receive multiple entries' request of arbitration, including the entry 260, as well as other entries from 216, 217 and 218. If entries 216, 217, and/or 218 have a different destination than entry 260, then the scheduler may receive the entries. If one or all of the entries of entries 216, 217, and 218 have the same destination as entry 260, the scheduler 204 will arbitrate and schedule the entry 260 rather than the other entries based on the atomicity priority bit. Because the scheduler 204 selects entry 260 in advance of other entries bound for the same destination as entry 260 based on the atomicity flag, the system can provide atomicity for inserted entries while avoiding HOL blocking by restocking. The scheduler 204 may then reset the atomicity priority bit of the entry 260. The entry 260 is then positioned in the next sequence of entries to be sent to its corresponding destination with entry 220 (i.e., entry 220 and entry 260 share the same destination) as one atomic unit (e.g., nothing in-between). In another example, the processor 208 may insert the entry 260 in front of the sequenced entries and then mark the first entry 220 (or any other entry) of the sequence with the property flag "restock." In this example, the path controller 210 sends the first entry 220 to the sources 202 via the restock path 214.

Figure 3:
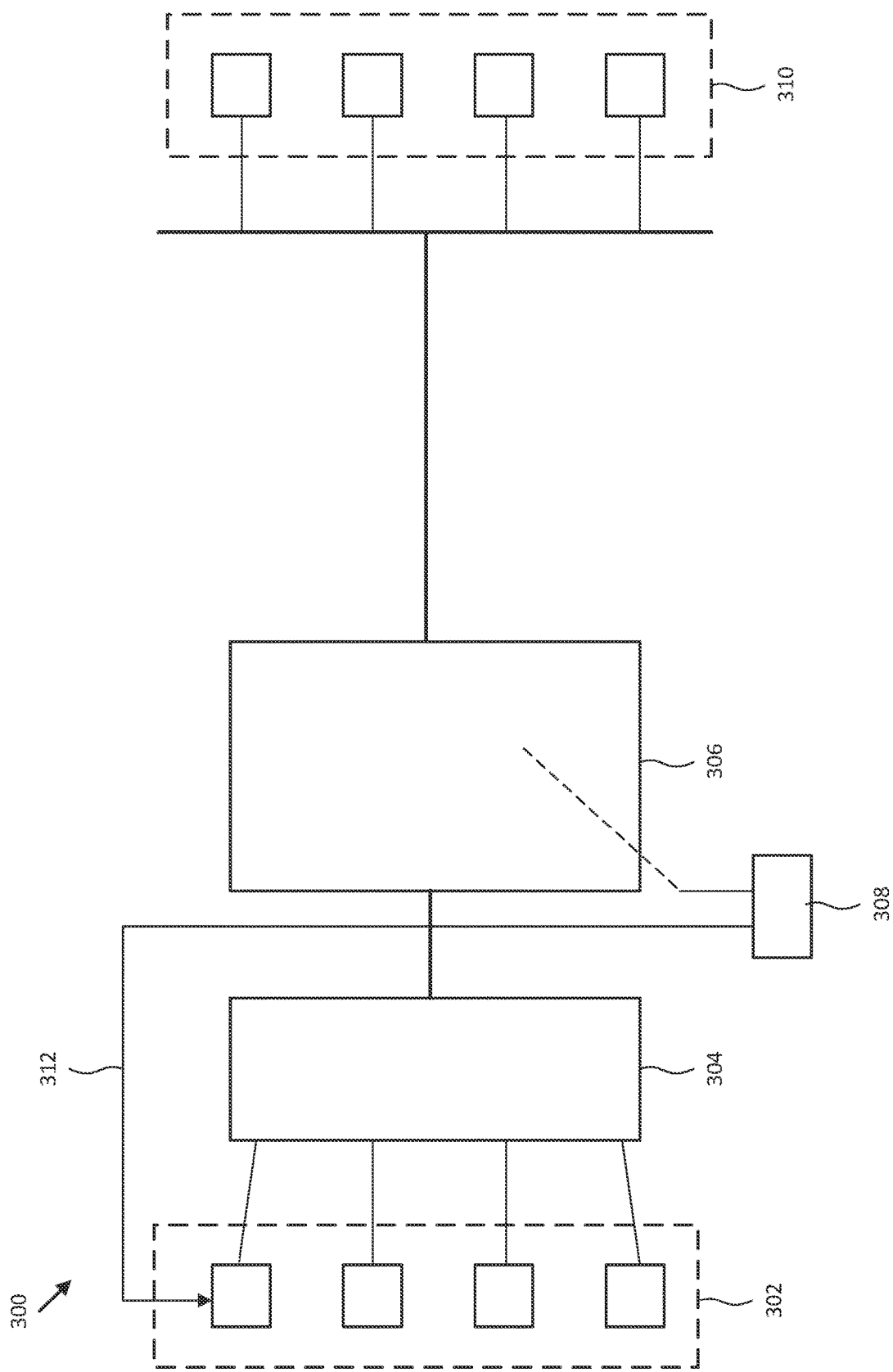
FIG. 3 illustrates a block diagram of a memory device, according to an embodiment.

FIG. 3 illustrates a block diagram of a memory device 300, according to an embodiment. The memory device 300 includes sources 302, a scheduler 304, a serial FIFO buffer 306, a processor 308 connected to the buffer 306, and destinations 310. The number of sources and destinations depicted is exemplary and not exclusive. The memory device 300 also includes a restock path 312 (e.g., an integrated structure or a separate physical structure) from the processor 308 to the sources 302. In this example, the functions of the path controller of FIGS. 1 and 2 are implemented in the software of the processor 308. In the device of FIG. 3, the path controller and restock path hardware may not be needed. The processor 308 may directly send restocked entries (e.g., an entry inserted by the processor 308 or an entry with a destination that is the same as an entry inserted by the processor 308) back to the sources 302. In the example depicted in FIG. 3, a restock flag may not be needed.

Figure 4:
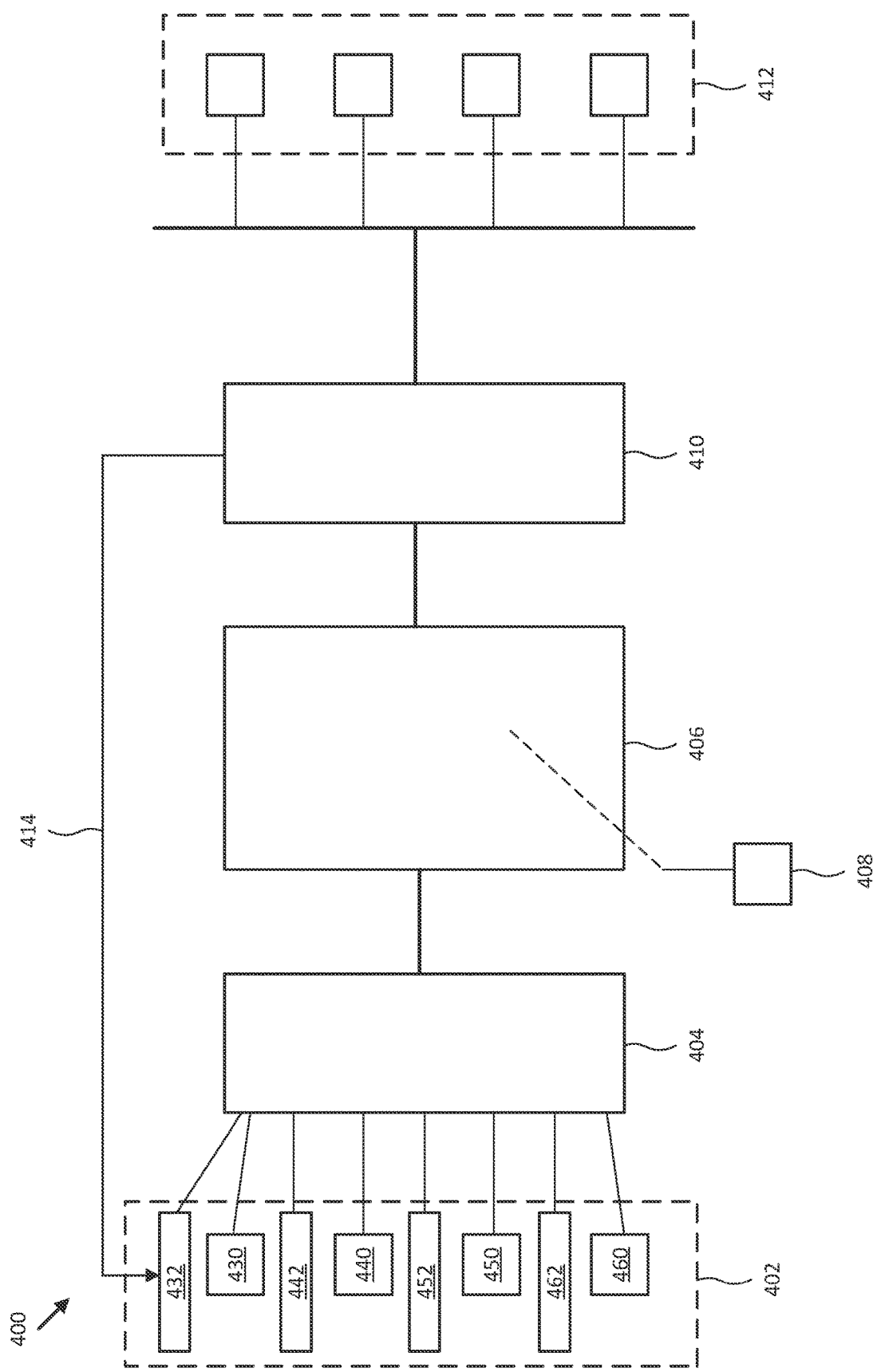
FIG. 4 illustrates a block diagram of a memory device, according to an embodiment.

FIG. 4 illustrates a block diagram of a memory device 400, according to an embodiment. The memory device 400 includes sources 402, a scheduler 404, a serial FIFO buffer 406, a processor 408 connected to the buffer 406, a path controller 410 and destinations 412. The number of sources and destinations depicted is exemplary and not exclusive. The scheduler 404, processor 408 and path controller 410 may be similar to those described at FIGS. 1 and 2. The memory device 400 also includes a restock path 414 (e.g., an integrated structure or a separate physical structure) from the path controller 410 to the sources 402. Each source 430, 440, 450 and 460 includes a corresponding priority queue 432, 442, 452 and 462. Although there is no need to have multiple restock paths of an entry to each source queue, a restock path per priority queue may be implemented, as well as a restock path per source. Each restock is operated to the priority queues, and the scheduler 404 arbitrates from the priority queue first.

Figure 5:
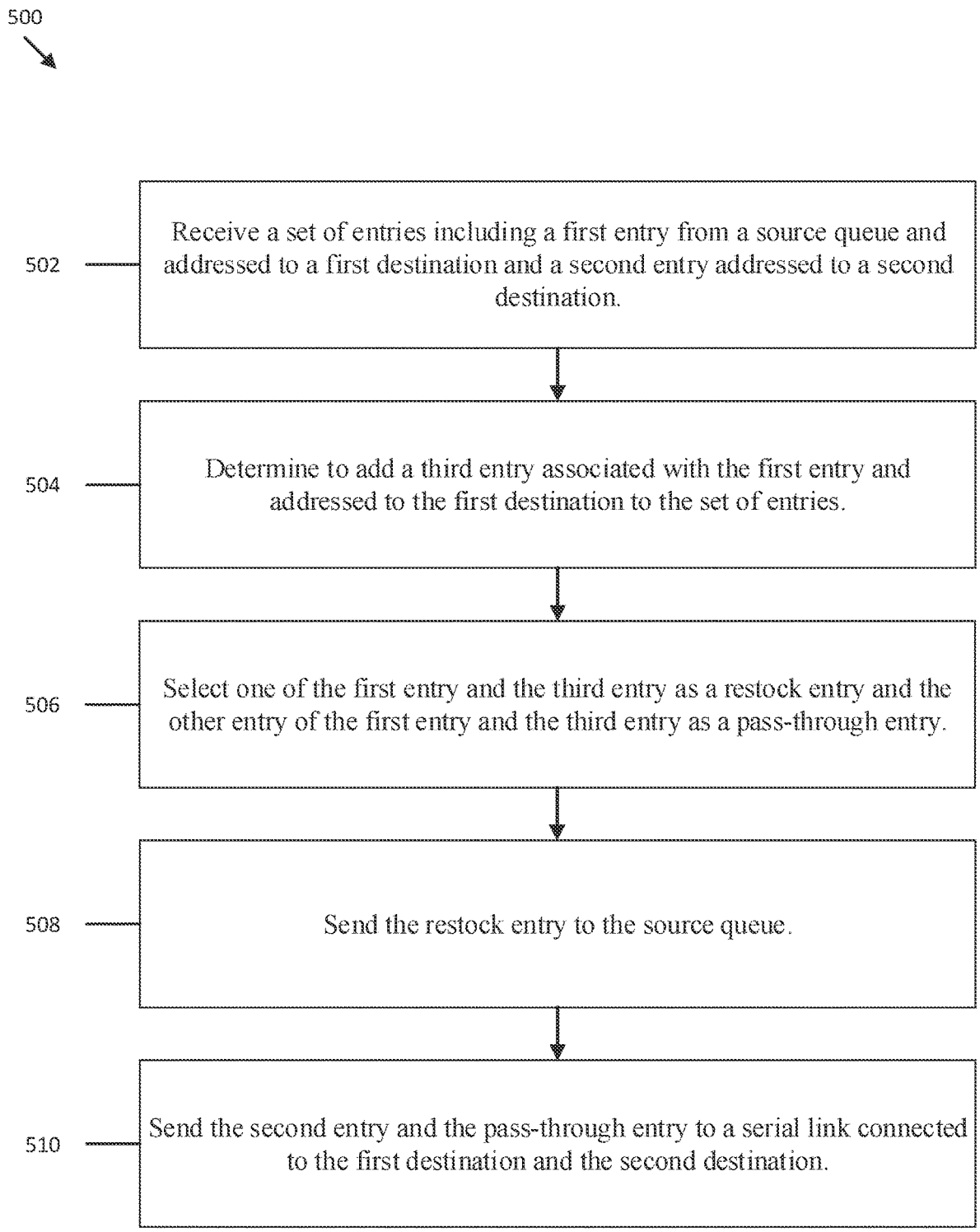
FIG. 5 illustrates a flowchart for a method of operating a memory device, according to an embodiment.

FIG. 5 illustrates a flowchart 500 for a method of operating a memory device, according to an embodiment. Any of the components or any combination of the components described (i.e., in the device diagrams) can be used to perform one or more of the operations of the flowchart 500. The operations depicted in the flowchart 500 are example operations and may involve various additional steps not explicitly provided in the flowchart 500. The order of the operations depicted in flowchart 500 is exemplary and not exclusive, as the order may vary depending on the implementation.

At 502, the memory device receives a set of entries including a first entry from a source queue and addressed to a first destination and a second entry addressed to a second destination. The entries may be received at a scheduler of the memory device. At 504, the memory device determines to add a third entry associated with the first entry and addressed to the first destination to the set of entries. At 506, the memory device selects one of the first entry and the third entry as a restock entry and the other entry of the first entry and the third entry as a pass-through entry. The determination and selection may be performed by a processor of the memory device. At 508, the memory device sends the restock entry to the source queue. At 510, the memory device sends the second entry and the pass-through entry to a serial link connected to the first destination and the second destination.

Figure 6:
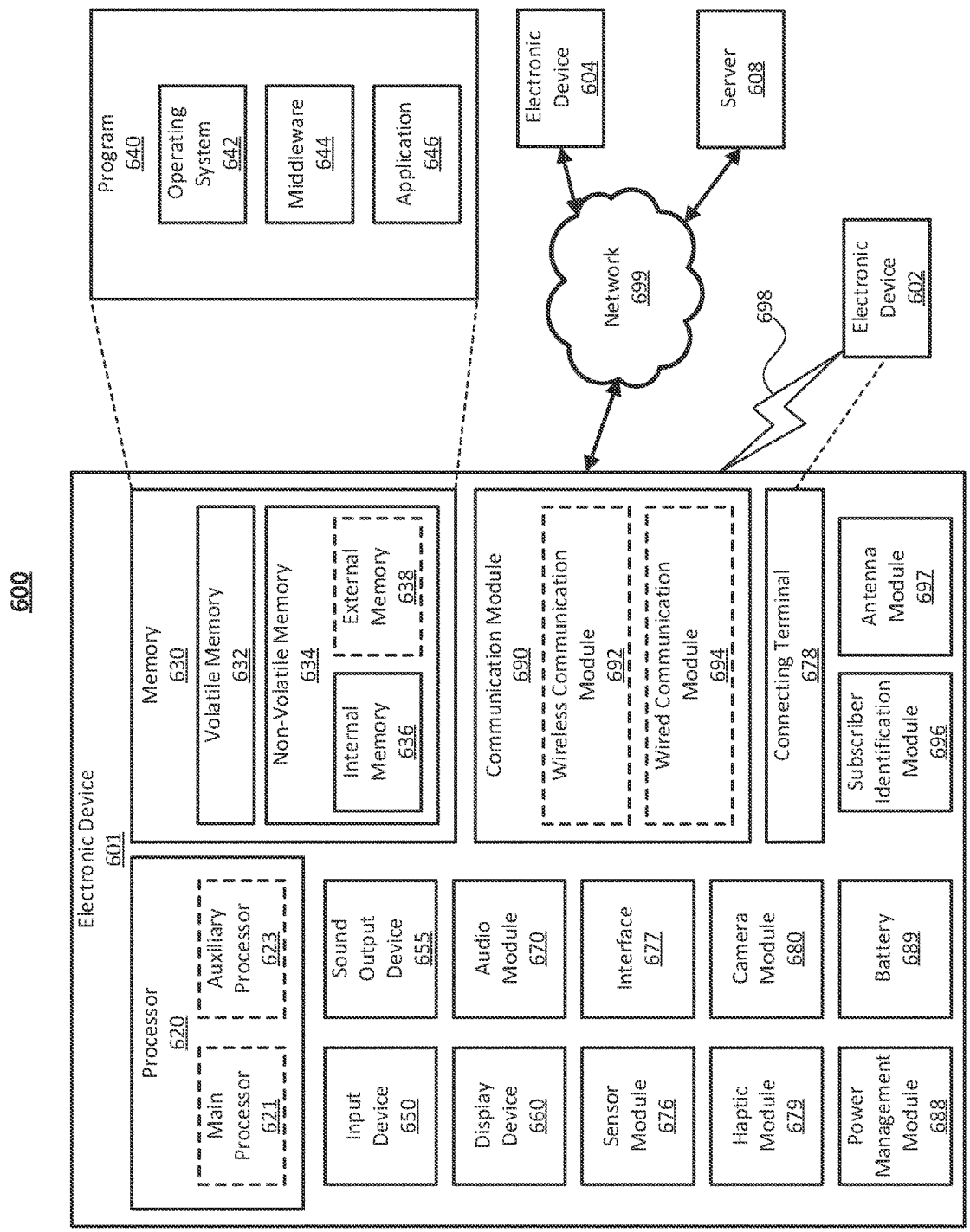
FIG. 6 illustrates a block diagram of an electronic device in a network environment, according to one embodiment.

FIG. 6 illustrates a block diagram of an electronic device 601 in a network environment 600, according to one embodiment. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a CPU or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wired) or wirelessly coupled with the electronic device 601.

The sensor module 676 may detect an operational state (e.g, power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g, wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g, a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g, internal memory 636 or external memory 638) that is readable by a machine (e.g, the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 7:
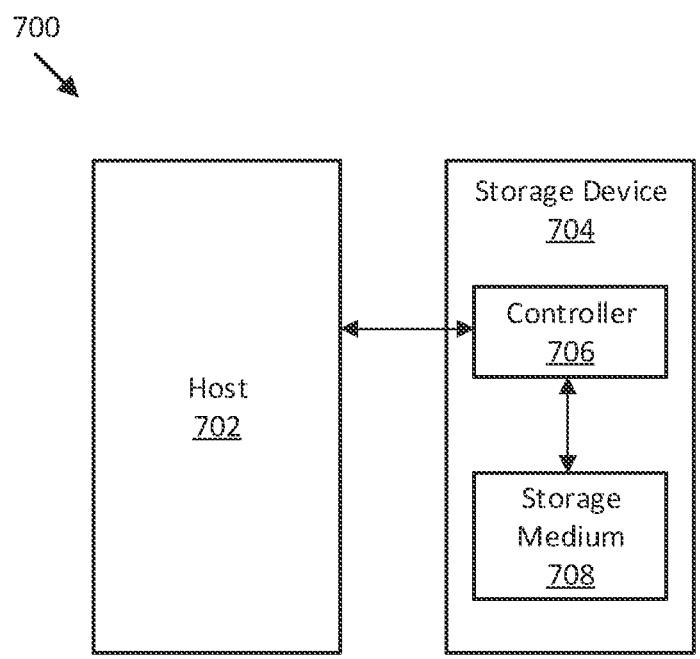
FIG. 7 illustrates a diagram of a storage system, according to an embodiment.

FIG. 7 illustrates a diagram of a storage system 700, according to an embodiment. The storage system 700 includes a host 702 and a storage device 704. Although one host and one storage device is depicted, the storage system 700 may include multiple hosts and/or multiple storage devices. The storage device 704 may be a solid state device (SSD), a universal flash storage (UFS), etc. The storage device 704 includes a controller 706 and a storage medium 708 connected to the controller 706. The controller 706 may be an SSD controller, a UFS controller, etc. The storage medium 708 may include a volatile memory, a non-volatile memory, or both, and may include one or more flash memory chips (or other storage media). The controller 706 may include one or more processors, one or more error correction circuits, one or more field programmable gate arrays (FPGAs), one or more host interfaces, one or more flash bus interfaces, etc., or a combination thereof. The controller 706 may be configured to facilitate transfer of data/commands between the host 702 and the storage medium 708. The host 702 sends data/commands to the storage device 704 to be received by the controller 706 and processed in conjunction with the storage medium 708. As described herein, the methods, processes and algorithms may be implemented on a storage device controller, such as controller 706. The sources and destinations described herein may correspond to elements of the host 702 (i.e., processors or applications) and the storage medium 708. In examples where multiple hosts are utilized, the sources and destinations may correspond to different hosts. As described above, the source queues and destinations may be implemented in the storage medium 708 of the storage device 704, the schedulers and path controllers may be implemented in the controller 706 of the storage device 704, and the processors and buffers may be implemented in the host 702.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of a memory device, comprising:
receiving a set of entries, wherein the set of entries includes:
a first entry from a source queue and addressed to a first destination; and
a second entry addressed to a second destination;
adding, by a processor of the memory device, a third entry to the set of entries in a buffer of the memory device, wherein the third entry is associated with the first entry and addressed to the first destination;
labeling, by the processor, one of the first entry and the third entry, in the set of entries in the buffer, as a restock entry, wherein the other of the first entry and the third entry is a pass-through entry;
sending, by a controller of the processor, the restock entry to the source queue; and
sending, by the controller, the second entry and the pass-through entry to a serial link connected to the first destination and the second destination.

2. The method of claim 1, further comprising:
inserting the third entry into the set to generate a first modified set; and
setting a property flag of the restock entry.

3. The method of claim 2, further comprising:
removing the restock entry from the first modified set based on the property flag to generate a second modified set; and
sending the second modified set to the serial link, wherein sending the second modified set to the serial link includes sending the second entry and the pass-through entry to the serial link.

4. The method of claim 1, wherein the restock entry includes a priority bit that is set indicating the restock entry is to have priority between multiple entries having a same destination.

5. The method of claim 4, further comprising:
selecting the restock entry based on the priority bit; and
resetting the priority bit of the restock entry.

6. The method of claim 4, wherein the priority bit indicates an atomicity of the restock entry such that the restock entry and the pass-through entry are processed atomically.

7. The method of claim 1, wherein the restock entry is sent to the source queue via a restock path.

8. A storage system, comprising:
a scheduler that receives a set of entries, wherein the set of entries includes:
   a first entry from a source queue and addressed to a first destination; and
   a second entry addressed to a second destination;
a processor that:
   adds a third entry to the set of entries in a buffer of the storage system, wherein the third entry is associated with the first entry and addressed to the first destination to the set of entries; and
   labels one of the first entry and the third entry, in the set of entries in the buffer, as a restock entry, wherein the other of the first entry and the third entry is a pass-through entry; and
a controller that:
   sends the restock entry to the source queue; and
   sends the second entry and the pass-through entry to a serial link connected to the first destination and the second destination.

9. The storage system of claim 8, wherein the processor inserts the third entry into the set to generate a first modified set; and
wherein the controller sets a property flag of the restock entry.

10. The storage system of claim 8, wherein the controller:
removes the restock entry from the first modified set based on the property flag to generate a second modified set; and
sends the second modified set to the serial link, and
wherein sending the second modified set to the serial link includes sending the second entry and the pass-through entry to the serial link.

11. The storage system of claim 8, wherein the restock entry includes a priority bit that is set indicating the restock entry is to have priority between multiple entries having a same destination.

12. The storage system of claim 11, wherein the controller selects the restock entry based on the priority bit and resets the priority bit of the restock entry.

13. The storage system of claim 11, wherein the priority bit indicates an atomicity of the restock entry such that the restock entry and the pass-through entry are processed atomically.

14. A memory device, comprising:
a scheduler;
a controller; and
a processor connected to the scheduler and the controller,
wherein the scheduler receives a set of entries, wherein the set of entries includes:
   a first entry from a source queue and addressed to a first destination; and
   a second entry addressed to a second destination;
wherein the processor:
   adds a third entry to the set of entries in a buffer of the memory device, wherein the third entry is associated with the first entry and addressed to the first destination to the set of entries; and
   labels one of the first entry and the third entry, in the set of entries in the buffer, as a restock entry, wherein the other of the first entry and the third entry is a pass-through entry; and
wherein the controller:
   sends the restock entry to the source queue; and
   sends the second entry and the pass-through entry to a serial link connected to the first destination and the second destination.

15. The memory device of claim 14, wherein the processor inserts the third entry into the set to generate a first modified set; and
wherein the controller sets a property flag of the restock entry.

16. The memory device of claim 14, wherein the controller:
removes the restock entry from the first modified set based on the property flag to generate a second modified set; and
sends the second modified set to the serial link,
wherein sending the second modified set to the serial link includes sending the second entry and the pass-through entry to the serial link.

17. The memory device of claim 14, the restock entry includes a priority bit that is set indicating the restock entry is to have priority between multiple entries having a same destination.

18. The memory device of claim 17, wherein the controller selects the restock entry based on the priority bit and resets the priority bit of the restock entry.

19. The memory device of claim 17, wherein the priority bit indicates an atomicity of the restock entry such that the restock entry and the pass-through entry are processed atomically.

20. The memory device of claim 14, wherein the restock entry is sent to the source queue via a restock path.

\* \* \* \* \*